US011857992B2

(12) United States Patent
Tan et al.

(10) Patent No.: US 11,857,992 B2
(45) Date of Patent: Jan. 2, 2024

(54) ACOUSTIC WAVE MICROFLUIDIC DEVICES WITH INCREASED ACOUSTIC WAVE ENERGY UTILISATION

(71) Applicant: Royal Melbourne Institute of Technology, Melbourne (AU)

(72) Inventors: James Tan, Melbourne (AU); Amgad Rezk, Melbourne (AU); Heba Ahmed, Melbourne (AU); Leslie Yeo, Melbourne (AU)

(73) Assignee: Royal Melbourne Institute of Technology, Melbourne (AU)

( * ) Notice: Subject to any disclaimer, the term of this patent is extended or adjusted under 35 U.S.C. 154(b) by 0 days.

(21) Appl. No.: 15/573,609

(22) PCT Filed: May 13, 2016

(86) PCT No.: PCT/AU2016/050363
§ 371 (c)(1),
(2) Date: Nov. 13, 2017

(87) PCT Pub. No.: WO2016/179664
PCT Pub. Date: Nov. 17, 2016

(65) Prior Publication Data

US 2018/0141073 A1 May 24, 2018

(30) Foreign Application Priority Data

May 13, 2015 (AU) ................................ 2015901737

(51) Int. Cl.
*B05B 17/06* (2006.01)
*B05B 1/06* (2006.01)
(Continued)

(52) U.S. Cl.
CPC ........ *B05B 17/0615* (2013.01); *B05B 7/0012* (2013.01); *B05B 17/0684* (2013.01);
(Continued)

(58) Field of Classification Search
CPC ............ B05B 17/0646; B05B 17/0615; B05B 17/0638; B05B 17/0684; B05B 17/0661
See application file for complete search history.

(56) References Cited

U.S. PATENT DOCUMENTS 4,142,163 A * 2/1979 Phillips .............. H03H 9/02574 252/62.9 R
6,273,342 B1 * 8/2001 Terada ................ B05B 17/0638 239/102.2
(Continued)

FOREIGN PATENT DOCUMENTS

CN 102981090 A 3/2013
CN 103981090 A 8/2014
(Continued)

OTHER PUBLICATIONS

Amgad R. Resk et al., "HYbriD Resonant Acoustics (HYDRA)", Advanced Materials, 2016, vol. 28, pp. 1970-1975.
(Continued)

*Primary Examiner* — Tuongminh N Pham
(74) *Attorney, Agent, or Firm* — Westman, Champlin & Koehler, P.A.

(57) ABSTRACT

A device, comprising: an electroacoustic transducer on a substrate; a power supply to supply electromagnetic wave energy to the electroacoustic transducer; and a source of a substance that is movable to the substrate; wherein the electroacoustic transducer and the substrate are configured to generate acoustic wave energy that is used to move the substance from the source to the substrate, and to manipulate the substance on the substrate.

21 Claims, 12 Drawing Sheets

(51) Int. Cl.

| | |
|---|---|
| ***B05B 7/00*** | (2006.01) |
| ***B08B 3/12*** | (2006.01) |
| ***B06B 1/06*** | (2006.01) |

(52) U.S. Cl.

CPC .............. *B06B 1/0644* (2013.01); *B08B 3/12* (2013.01); *B05B 17/0661* (2013.01)

(56) References Cited

U.S. PATENT DOCUMENTS

| | | | | |
|---|---|---|---|---|
| 6,679,436 | B1 | 1/2004 | Onishi et al. | |
| 2012/0097752 | A1* | 4/2012 | Okano ................ | B01F 3/04978 239/1 |
| 2012/0187209 | A1* | 7/2012 | Friend .................. | A61M 11/005 239/4 |
| 2012/0285447 | A1* | 11/2012 | Schipper ............... | A61B 5/1117 128/200.16 |
| 2017/0333644 | A1* | 11/2017 | Reboud ................ | A61M 11/005 |

FOREIGN PATENT DOCUMENTS

| | | | |
|---|---|---|---|
| JP | 2004190537 | A | 7/2004 |
| JP | 2007513729 | A | 5/2007 |
| JP | 2012525944 | A | 10/2012 |
| WO | 2005056104 | A2 | 6/2005 |
| WO | 2010129994 | A1 | 11/2010 |
| WO | 2010150629 | A1 | 12/2010 |
| WO | 2014132228 | A1 | 9/2014 |
| WO | 2017173478 | A1 | 12/2017 |

OTHER PUBLICATIONS

Extended European Search Report dated Dec. 3, 2018, in corresponding European patent application No. EP16791837.4.

International Search Report dated Aug. 16, 2016 for corresponding International Application PCT/AU2016/050363, filed May 13, 2016.

International Preliminary Report on Patentability dated Sep. 12, 2017 for corresponding International Application PCT/AU2016/050363, filed May 13, 2016.

Kurosawa M. et al., "Surface acoustic wave atomizer", Sensors and Actuators A, vol. 50, issues 1-2, Aug. 1995 pp. 69-74.

Qi A. et al., "A Miniaturized Surface Acoustic Wave Atomizer with a Disposable Pump-free Liquid Supply System for Continuous Atomization", Proceedings of the 2011 6th IEEE International Conference on Nano/Micro Engineered and Molecular Systems, Kaohsiung, Taiwan, Feb. 20-23, 2011, pp. 295-298.

Written Opinion of the International Searching Authority dated Aug. 16, 2016 for corresponding International Application PCT/AU2016/050363, filed May 13, 2016.

Office Action issued in corresponding Japanese Patent Application No. 2017-559067, dated Mar. 24, 2020.

* cited by examiner 2.0 μm

ACOUSTIC WAVE MICROFLUIDIC DEVICES WITH INCREASED ACOUSTIC WAVE ENERGY UTILISATION

CROSS-REFERENCE TO RELATED APPLICATIONS

This Application is a Section 371 National Stage Application of International Application No. PCT/AU2016/050363, filed May 13, 2016 and published as WO/2016/179664 on Nov. 17, 2016, in English, which claims priority to Australian Patent Application No. 2015901737, filed May 13, 2015, the contents of which are each hereby incorporated by reference in their entirety.

FIELD

The present invention relates to acoustic wave microfluidic devices with increased acoustic wave energy utilisation.

BACKGROUND

Acoustic wave microfluidic devices, such as surface acoustic wave (SAW) nebulisation or atomisation devices, have been proposed for pulmonary drug delivery and a wide variety of other microfluidic applications. SAW microfluidic devices comprise an interdigital transducer (IDT) on a piezoelectric substrate. Radio frequency (RF) power is applied to the IDT to generate SAW that passes through liquid on the substrate to generate aerosol drops. The substrate is deliberately chosen as a rotated Y-cut of lithium niobate to suppress propagation of bulk waves inside the substrate so that only pure SAW is used for atomisation.

Current SAW microfluidic devices have limited nebulisation or atomisation rates between 1 and 100 μl/min. Such low atomisation rates are insufficient for effective patient dosing in pulmonary drug delivery. Simply increasing the RF power level and/or the liquid supply rate to achieve increased atomisation rates sufficient for effective patient dosing is not practical.

Increasing the RF power level leads to increased thermal loading on the substrate and/or on components of the device, and requires large and cumbersome power supplies. Further, increasing the RF power level also increases the possibility of collateral damage to the drug being delivered by denaturation of complex molecules or cells. Finally, increasing the liquid supply rate leads to drowning the device and stopping atomisation altogether.

In this context, there is a need for acoustic wave microfluidic devices with increased utilisation of input RF power and output acoustic wave energy to provide increased microfluidic manipulation capabilities.

SUMMARY

According to the present invention, there is provided a device, comprising:

an electroacoustic transducer on a substrate;

a power supply to supply electromagnetic wave energy to the electroacoustic transducer; and a source of a substance that is movable to the substrate;

wherein the electroacoustic transducer and the substrate are configured to generate acoustic wave energy that is used to move the substance from the source to the substrate, and to manipulate the substance on the substrate.

The acoustic wave energy may comprise SAW propagating along a first surface of the substrate, an opposite second surface of the substrate, or a combination thereof.

The substrate may have a thickness that is comparable to the wavelength of the acoustic wave energy.

The acoustic wave energy may comprise a combination of SAW and surface reflected bulk waves (SRBW). As used herein, "SRBW" refers to bulk acoustic waves (BAW) propagating along the first and second surfaces by internal reflection through the substrate between the first and second surfaces. The combination of SAW and SRBW may be used to move the substance from the source to the substrate, and to manipulate the substance on the substrate.

The acoustic wave energy may comprise a combination of SAW and a standing acoustic wave in the electroacoustic transducer, wherein SAW is used to move the substance from the source along the substrate and onto the electroacoustic transducer as a thin liquid film, and wherein the standing acoustic wave in the electroacoustic transducer is used to atomise or nebulise the thin liquid film.

The source of the substance may be arranged on, in or closely adjacent to a surface of the substrate, a side edge of the substrate, an end edge of the substrate, or a combination thereof.

The electroacoustic transducer may comprise one or more interdigital transducers arranged on the first surface of the substrate, the second surface of the substrate, or a combination thereof.

The substrate may comprise a single crystal piezoelectric substrate, such as a rotated Y-cut of lithium niobate or lithium tantalate.

The power supply, substrate and source may be integrated in a universal serial bus (USB) holder.

The power supply may comprise a battery.

The substance may be a movable substance comprising a liquid, a solid, a gas, or combinations or mixtures thereof. The substance may comprise functional or therapeutic agents selected from drugs, soluble substances, polymers, proteins, peptides, DNA, RNA, cells, stem cells, scents, fragrances, nicotine, cosmetics, pesticides, insecticides, and combinations thereof.

The substance may be atomised or nebulised at a rate equal to or greater than 1 ml/min.

The present invention further provides a method, comprising:

moving a substance from a source thereof to a substrate using hybrid acoustic wave energy; and manipulating the substance on at least one surface of the substrate using the hybrid acoustic wave energy;

wherein the hybrid acoustic wave energy comprises surface acoustic waves propagating along the at least one surface of the substrate, and bulk acoustic waves internally reflecting between the at least one surface of the substrate and at least one other surface of the substrate.

The present invention also provides an inhaler or nebuliser for pulmonary drug delivery comprising the device described above.

The present invention further provides eyewear for ophthalmic drug delivery comprising the device described above.

The present invention also provides an electronic cigarette comprising the device described above.

The present invention further provides a scent generator comprising the device described above.

The present invention also provides a method, comprising using the device described above to perform microfluidic operations on a substance, wherein the microfluidic operations comprise atomising, nebulising, moving, transporting, mixing, jetting, streaming, centrifuging, trapping, separating, sorting, coating, encapsulating, manipulating, desalinating, purifying, exfoliating, layering, and combinations thereof.

The present invention further provides a method, comprising using the device described above to atomise or nebulise a soluble substance to produce particles, powders or crystals with a diameter of 1 nm to 1 mm.

The present invention further provides a method, comprising using the device described above to coat or encapsulate drug molecules for therapeutic purposes within particles or powders with a diameter of 1 nm to 1 mm.

The present invention also provides a method, comprising using the device described above to purify or desalinate a liquid by separating salt, crystals or impurities from the liquid.

The present invention further provides a method, comprising using the device described above to exfoliate a material from a three-dimensional (3D) bulk form to a two-dimensional (2D) exfoliated form.

The material may comprise graphene, boron nitride (BN), transition metal dichalcogenides (TMDs), transition metal oxides (TMOs), black phosphorous, silicene, germanene, and combinations thereof.

The 3D bulk form of the material may comprise the material in a liquid or an intercalating material.

The 2D exfoliated form of the material may comprise a sheet, a quantum dot (QD), a flake, a layer, a film, or combinations or pluralities or structures thereof.

The 2D exfoliated form of the material may have lateral dimensions between 1 nm and 200 nm.

BRIEF DESCRIPTION OF DRAWINGS

Embodiments of the invention will now be described by way of example only with reference to the accompanying drawings, in which.

DETAILED DESCRIPTION

Figure 1:
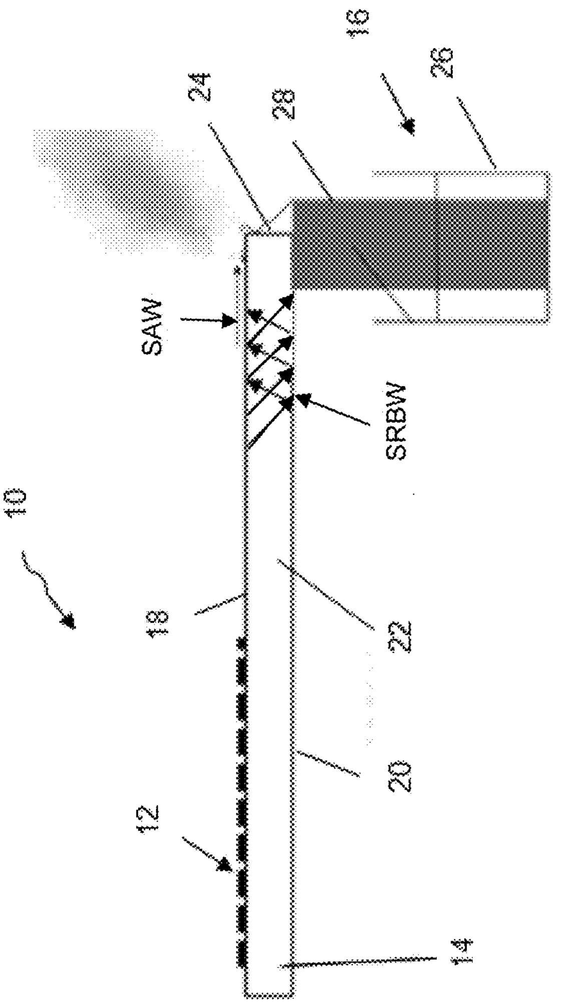
FIG. 1 is a schematic diagram of an acoustic wave microfluidic device according to one embodiment of the present invention.
Figure 2:
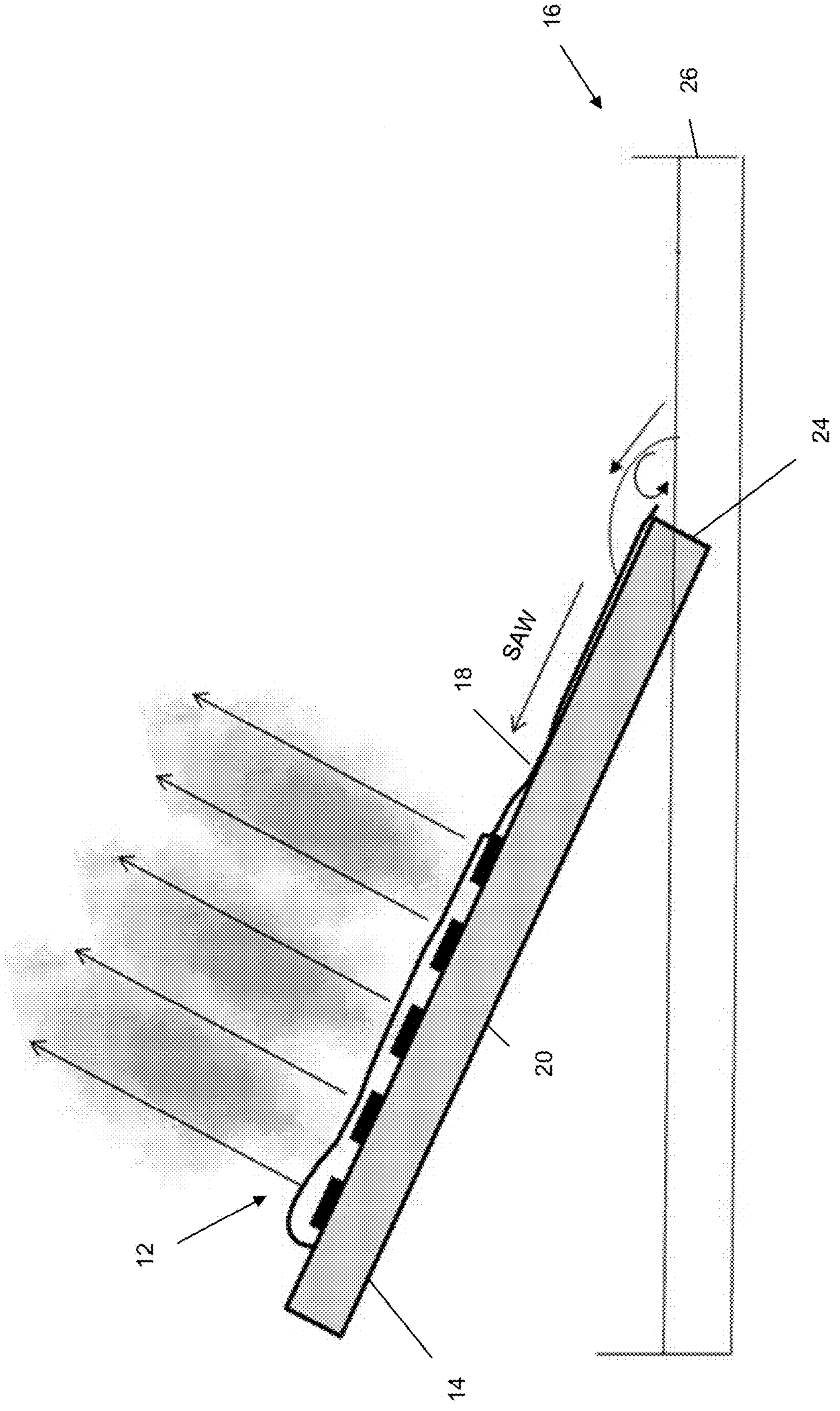
FIG. 2 is a schematic diagram of an alternative embodiment of the device.

FIGS. 1 and 2 illustrate an acoustic wave microfluidic device 10 according to embodiments of the present invention. The device 10 may generally comprise an electroacoustic transducer 12 on a substrate 14, and a power supply (not shown) to supply electromagnetic wave energy, such as RF power, to the electroacoustic transducer 12. The device 10 may further comprise a source 16 to of a substance that is movable to the substrate 14. The substance may comprise matter or material in a form that is movable from the source 16 to the substrate 14 by acoustic wave energy. The substance may comprise a liquid, a solid, a gas, or combinations or mixtures thereof. For example, the substance may comprise matter or material as a liquid, a solution, a dispersion, etc.

The electroacoustic transducer 12 may comprise a large plurality of IDT electrodes arranged on a first surface 18 of the substrate 14, an opposite second surface 20 of the substrate 14, or a combination thereof. Other equivalent or alternative electroacoustic transducers may also be used. The substrate 14 may be a single crystal piezoelectric substrate, such as a rotated Y-cut of lithium niobate (LN) or lithium tantalate. For example, the substrate 14 may comprise a 128° rotated Y-axis, X-axis propagating lithium niobate crystal cut (128YX LN). Other equivalent or alternative piezoelectric substrates may also be used.

Although not shown, one end of the substrate 14 may be mechanically secured and supported between two or more contact probes which provide RF power. Further, the one supported end of the substrate 14 may be mounted via one of more springs and/or fixtures on the first surface 18 opposite to the IDT finger electrodes 12 to create minimum contact area with the substrate 14 to minimise the damping out of the vibrational energy imparted to the substrate 14 by the electroacoustic transducer 12. The substrate 14 may therefore protrude from its mechanical fixtures at the one resiliently-supported end in similar fashion to a tuning fork such that it allows for maximum acoustic vibration at an opposite free end of the substrate 14.

The source 16 of the substance may be arranged on, in or closely adjacent, in touching or non-touching relationship, to the first and/or second surfaces 18, 20 of the substrate 14 via a side edge 22 of the substrate 14, an end edge 24 of the substrate 14, or a combination thereof. Referring to FIG. 1, in one embodiment, the source 16 may comprise a reservoir 26 of a liquid substance and a wick 28 arranged to contact the side and/or end edges 22, 24 of the substrate 14. Referring to FIG. 2, in another embodiment, the source 16 may comprise the reservoir 24 alone arranged to directly contact the end edge 24 of the substrate 14. Other equivalent or alternative substance source arrangements may also be used.

The electroacoustic transducer 12 and the substrate 14 may be configured to generate acoustic wave energy that is used both to move (eg, draw out, pull out and/or thin out) the liquid substance from the source 16 onto the substrate 14 as a thin liquid film, and to atomise or nebulise the thin liquid film. For example, in one embodiment of the device 10, the acoustic wave energy may manifest as SAW propagating along the first surface 18 of the substrate 14, the second surface 20 of the substrate 14, or both the first and second surfaces 18, 20 of the substrate 14. That is, SAW may propagate along the first surface 18, around the end edge 24, and along the second surface 20 of the substrate 14. While it is not intended to be bound by any particular theory, it is believed that it is possible that SAW may propagate in both forward and reverse directions relative to the electroacoustic transducer 12 on each of the first and second surfaces 18, 20 of the substrate 14. It is believed that SAW travelling in the reverse direction on the first and/or second surfaces 18, 20 may at least partially be responsible for drawing, pulling and thinning out the liquid substance from the reservoir 26 and/or wick 28.

The use of acoustic wave energy travelling along the second surface 20 is contrary to conventional SAW microfluidic devices where only the first surface 18 is used. This manifestation and utilisation of the available acoustic wave energy may be achieved by configuring the substrate 14 so that it has a thickness which is comparable (eg, approximately equal) to the SAW wavelength. In other words, the device 10 may be configured to satisfy a relationship of $\lambda_{SAW}/h\sim1$, where h represents a thickness of the substrate 14, and $\lambda_{SAW}$ represents the SAW wavelength which corresponds to the resonant frequency of the device 10. The SAW wavelength may be determined based at least in part by the configuration of the electroacoustic transducer 12, for example, the spacing of the IDT electrodes. Mass loading of a large plurality of IDT fingers (eg, equal to or greater than around 40 to 60 fingers) and low frequency IDT designs between around 10 to 20 MHz may be selected to give the optimal combination of SAW and SRBW. Other equivalent or alternative configurations of the electroacoustic transducer 12 and the substrate 14 may also be used.

Further, by configuring the thickness of the substrate 14 to be comparable to the wavelength of the acoustic wave energy, the acoustic wave energy in another embodiment of the device 10 may manifest as SRBW propagating along the first and second surfaces 18, 20 by internal reflection through the substrate 14 between the first and second surfaces 18, 20. Again, while it is not intended to be bound by any particular theory, it is believed that it is possible that SRBW may also propagate in both forward and reverse directions relative to the electroacoustic transducer 12 on each of the first and second surfaces 18, 20 of the substrate 14. It is believed that SRBW travelling in the reverse direction on the first and/or second surfaces 18, 20 may at least partially be responsible for drawing, pulling and thinning out the liquid substance from the reservoir 26 and/or wick 28. A combination of SAW and SRBW may then be used both to draw out the liquid substance from the liquid supply 16 onto the substrate 14 as a thin liquid film, and to atomise the thin liquid film. For example, in the embodiment illustrated in FIG. 1, the combination of SAW and SRBW travelling along both the first and second surfaces 18, 20 of the substrate 14 may be used both to draw out the liquid substance from the source 16 onto the first surface 18 of the substrate 14 as a thin liquid film, and to atomise or nebulise the thin liquid film on the first surface 18 of the substrate 14.

Figure 15:
FIG. 15 is a photograph of the device of FIG. 2.

In a further embodiment of the device 10, the electroacoustic transducer 12 and the substrate 14 may be configured to generate acoustic wave energy that may manifest as a standing acoustic wave in or on the electroacoustic transducer 12. SAW may be used to draw out the liquid substance from the source 16 along the substrate 14 and onto the electroacoustic transducer 12 as a thin liquid film. The standing acoustic wave may then be used to atomise the thin liquid film directly on the electroacoustic transducer 12. For example, in the embodiment illustrated in FIG. 2, SAW travelling along the first surface 18 of the substrate 14 may be used to draw out the liquid substance from the source 16 along the first surface 18 and onto the electroacoustic transducer 12 as a thin liquid film. The standing acoustic wave in or on electroacoustic transducer 12 may then be used to directly atomise or nebulise the thin liquid film. Since the acoustic wave energy on the IDT 12 is the strongest, the efficiency here is at the highest in terms of microfluidic manipulation. In other words, atomising directly on the IDT 12 by drawing, running and thinning out a liquid film from the reservoir 26 to the IDT 12 may result in very high and efficient atomisation rates, for example, equal to or greater than 1 ml/min. FIG. 15 illustrates a strong aerosol jet or liquid stream generated directly on the IDT 12 of this embodiment of the device 10.

Figure 4:
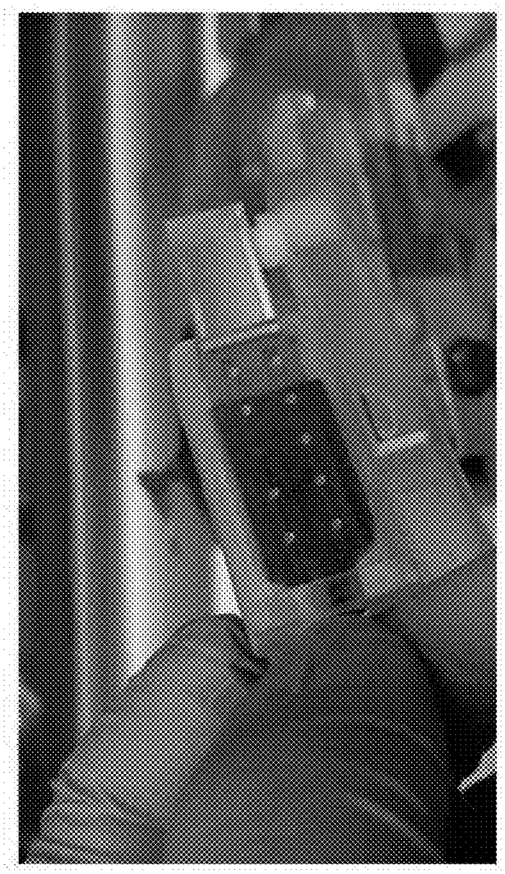
FIGS. 4 to 6 are photographs of the device of FIG. 3.
Figure 3:
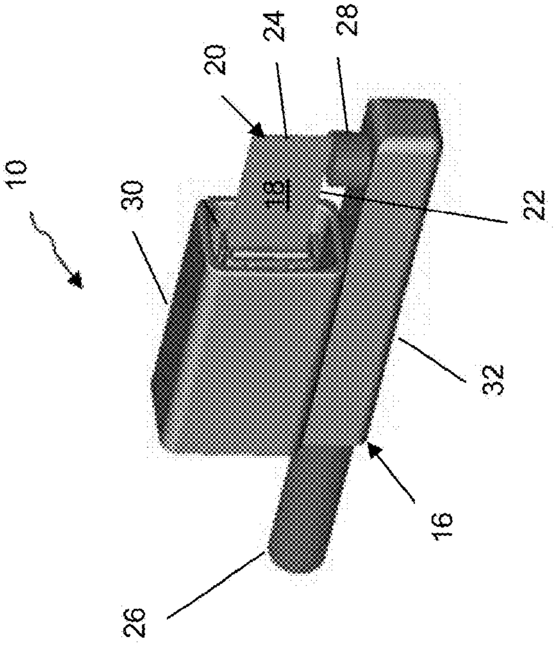
FIG. 3 is a perspective view of a further alternative embodiment of the device.

Referring to FIGS. 3 and 4, in one embodiment of the device 10, the power supply, substrate 14 and source 16 may be integrated in a USB holder 30. For example, the resilient supports and couplings for the one supported end of the substrate 14 described above may be integrated into the body of the USB holder 30. Further, the power supply for the electroacoustic transducer 12 may be integrated into, or provided via, the USB holder 30. For example, the power supply may comprise a battery integrated in the USB holder 30.

Further, the source 16 of the liquid substance may be integrated onto the USB holder 30. For example, the source 16 may further comprise a source body 32 arranged under the USB holder 30 to fluidly connect the reservoir 26 to the wick 28. The reservoir 18 may be arranged at the rear of the USB holder 34, and the wick 20 may be arranged on the source body 32 adjacent to the free end edge 24 of the substrate 14. The wick 28 may fluidly contact a lower side edge 22 of the substrate 14 between the first and second surfaces 18, 20.

Figure 6:
Figure 5:

As described above, the electroacoustic transducer 12 and the substrate 14 may be collectively configured so that the device 10 generates a combination of SAW and SRBW which may be used collectively to move or draw out the liquid substance from the source 16 onto each of the first and second surfaces 18, 20 of the substrate 14 as a thin liquid film, and to atomise or nebulise the thin liquid film on each of the first and second surfaces 18, 20 to generate two opposite, outwardly-directed jets, streams or mists of aerosol drops of the liquid. FIGS. 5 and 6 illustrate the generation of twin aerosol jets by this embodiment of the device 10.

Embodiments of the device 10 described above may be used to atomise or nebulise a liquid substance a rate greater than 100 μl/min, for example, equal to or greater than 1 ml/min. The liquid substance may comprise functional or therapeutic agents selected from drugs, soluble substances, polymers, proteins, peptides, DNA, RNA, cells, stem cells, scents, fragrances, nicotine, cosmetics, pesticides, insecticides, and combinations thereof. Other equivalent or alternative functional or therapeutic agents may be mixed, dissolved, dispersed, or suspended in the liquid, for example, biological substances, pharmaceutical substances, fragrant substances, cosmetic substances, antibacterial substances, antifungal substances, antimould substances, disinfecting agents, herbicides, fungicides, insecticides, fertilisers, etc. The device 10 may also be used to atomise or nebulise a soluble substance to produce particles, powders or crystals with a diameter of 1 nm to 1 mm. Further, the device 10 may be used to coat or encapsulate drug molecules for therapeutic purposes within particles or powders with a diameter of 1 nm to 1 mm. The device 10 may also be used for other equivalent or alternative biomicrofluidic, microfluidic, microparticle, nanoparticle, nanomedicine, microcrystallisation, microencapsulation, and micronisation applications. For example, the device 10 may be configured to perform acoustic wave microfluidic operations on a substance comprising atomising, nebulising, moving, transporting, mixing, jetting, streaming, centrifuging, trapping, separating, sorting, coating, encapsulating, manipulating, desalinating, purifying, exfoliating, layering, and combinations thereof. Other alternative or equivalent microfluidic operations may also be performed using the device 10.

Figure 14:
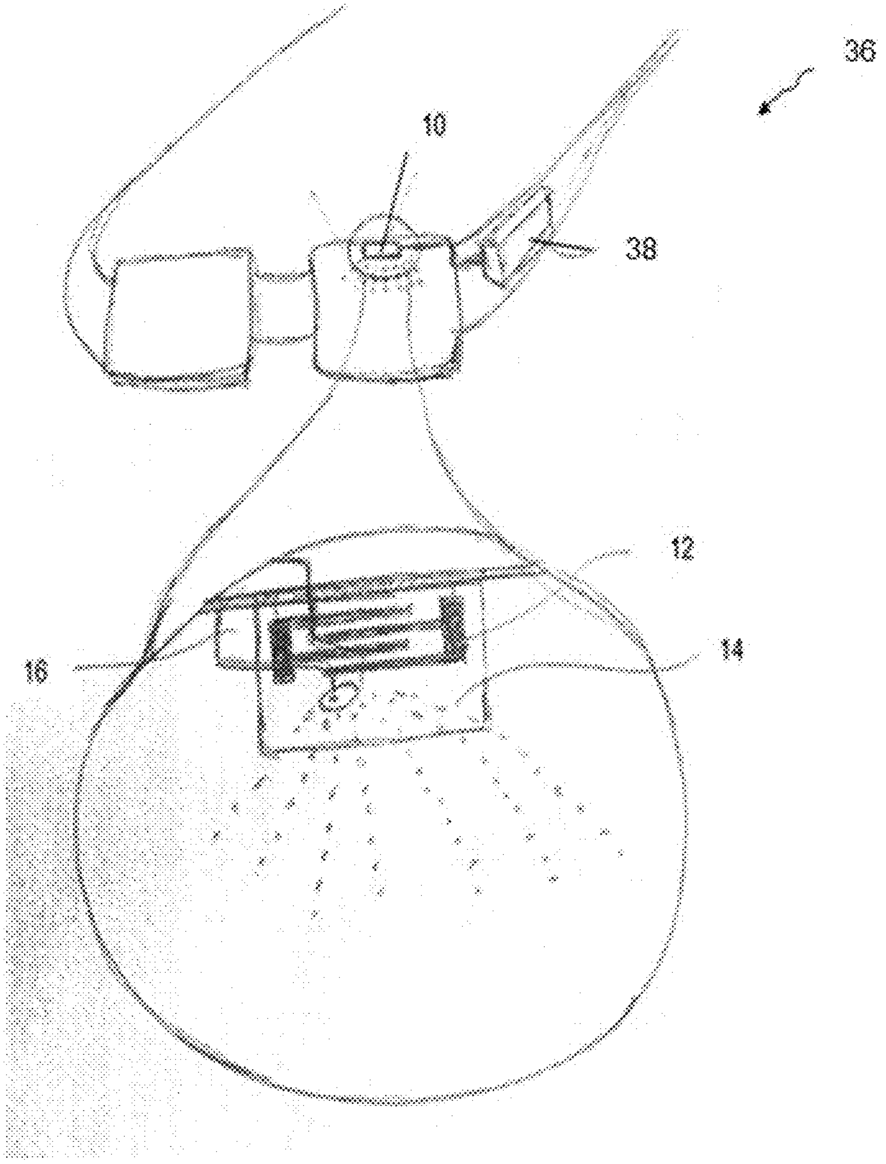
FIG. 14 is a schematic diagram of eyewear incorporating the device for ophthalmic drug delivery.

The device 10 may be implemented with battery power in a compact size at low cost with a low form factor so that it is suitable for incorporation into a wide variety of other devices, systems and apparatus. For example, the device 10 may be incorporated into, or configured as, an inhaler or nebuliser for pulmonary drug delivery. The device 10 may also be incorporated into an electronic cigarette to atomise liquids containing nicotine and/or flavours. The device 10 may further be configured as a scent generator and incorporated into a game console. Alternatively, the device 10 may be incorporated into eyewear 36, such as goggles or glasses, for ophthalmic drug delivery, as illustrated in FIG. 14. A power supply 38 for the device 10 may be provided in an arm of the eyewear 36. The eyewear 36 may be used for delivery of aerosols, particles and powders comprising a drug, as well as polymer particles encapsulating the drug, for treating ophthalmic conditions. Other equivalent or alternative applications of the device 10 may also be used.

The device 10 described above may also be used to purify or desalinate a liquid by separating salt, crystals, particles, impurities, or combinations thereof, from the liquid. For example, nebulisation of saline solutions by the device 10 may lead to the generation of aerosol droplets comprising the same solution, whose evaporation leads to the formation of precipitated salt crystals. Due to their mass, the salt crystals sediment and therefore can be inertially separated from the water vapour, which, upon condensation, results in the recovery of purified water. Scaling out (or numbering up) the device 10 into a platform comprising many devices 10 in parallel may then lead to an energy efficient method for large-scale desalination. Alternatively, a miniaturised platform of a single or a few devices 10 may be used as a battery operated portable water purification system, which is potentially useful in third world settings.

In other embodiments, the device 10 may be used exfoliate a material from a 3D bulk form to a 2D exfoliated form. The material may, for example, comprise graphene, BN, TMDs, TMOs, black phosphorous, silicene, germanene, and combinations thereof. Other alternative or equivalent materials may also be used. The 3D bulk aggregate form of the material may comprise the material in a liquid or an intercalating material. The 2D exfoliated form of the material may comprise a sheet, a QD, a flake, a layer, a film, or combinations or pluralities or structures thereof. The 2D exfoliated form of the material may, for example, have lateral dimensions between 1 nm and 200 nm.

Figure 16:
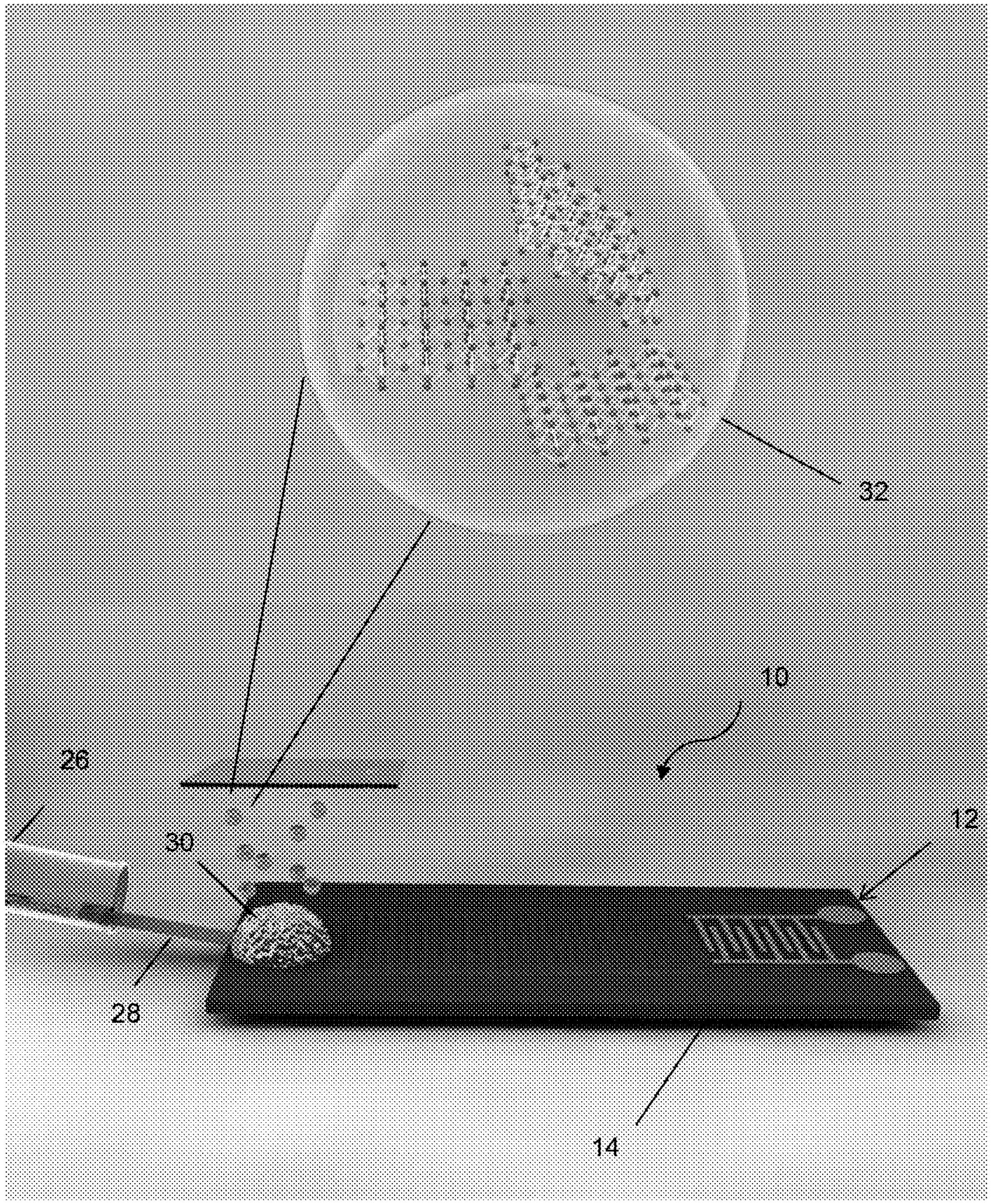
FIG. 16 is a schematic diagram of the device configured to exfoliate 3D bulk material into 2D exfoliated material.
Figure 17:
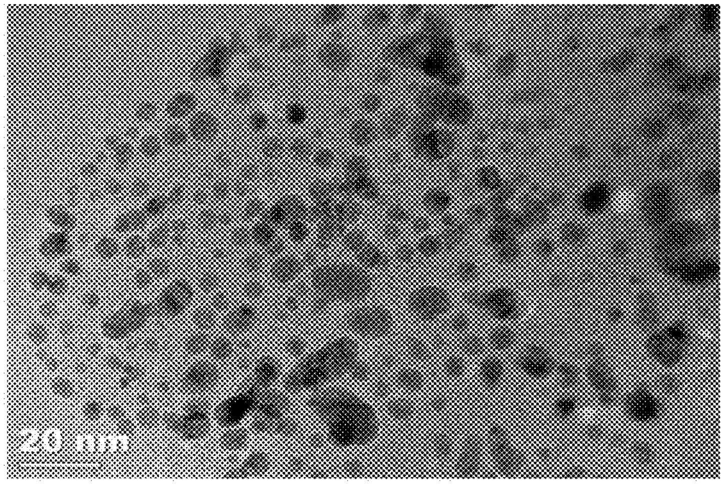
FIG. 17 is a transmission electron microscopy (TEM) image of 2D QDs formed by the device.
Figure 18:
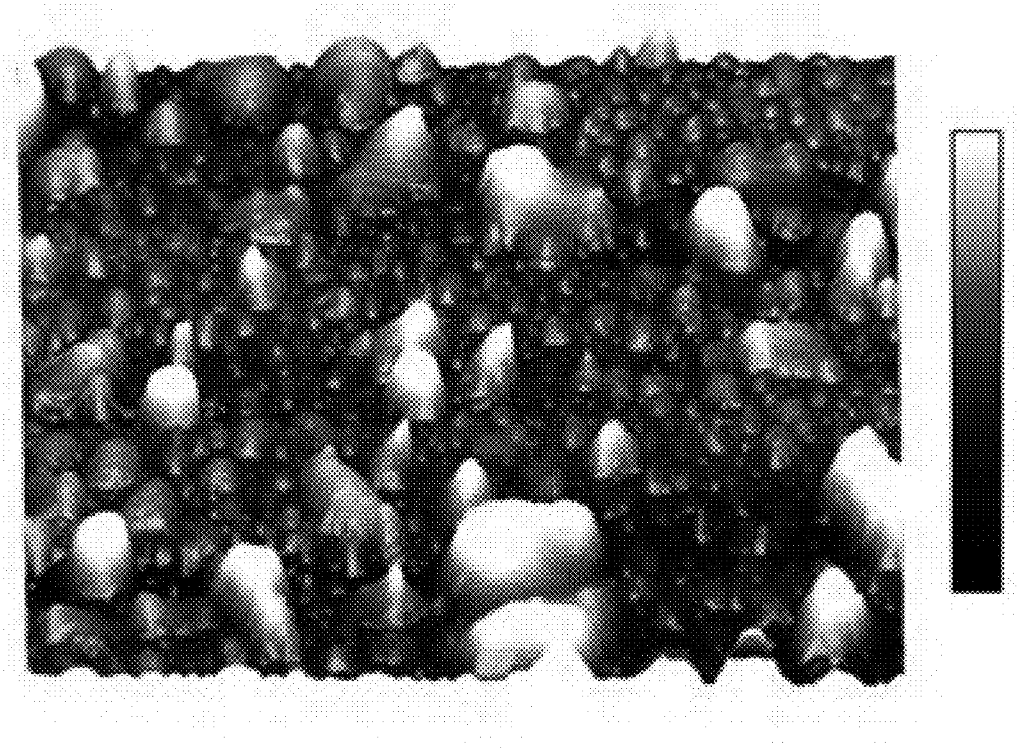
FIG. 18 is atomic force microscopy (AFM) image of a thin film of the 2D QDs.

In these embodiments, the HYDRA device 10 may be used to provide a unique, high-throughput, rapid exfoliation method to produce large sheets and QDs of, for example, but not limited to TMOs, TMDs, as well as other host of 2D materials using high frequency sound waves produced by the HYDRA device 10 in water or in the presence of a pre-exfoliation step using an intercalating material. Nebulisation of the bulk solution with the HYDRA device 10 may lead to shearing of the interlayer bonds within the 3D bulk material producing single, or few layers of, flakes, as illustrated in FIG. 16. In the illustrated embodiment, a 3D bulk material solution 30 may be fed via a conduit 26 with the aid of a paper wick 28 along the central line of substrate 14 of the HYDRA device 10. The high frequency sound waves produced during nebulisation may lead to shearing of the 3D bulk material 30 in flight to form 2D exfoliated materials 32. FIG. 17 is a TEM image showing a HYDRA nebulised drop with a few layers of $MoS_2$ QDs. FIG. 18 is an AFM image of a thin film of $MoS_2$ QDs covering a 2 μm x and 2 μm. In this application, the HYDRA device 10 may provide the ability to produce large area coverage through continuously nebulising the 2D material on a substrate producing a tunable film pattern and thickness, suitable for application purposes in, but not limited to, field-effect transistors (FETs), memory devices, photodetectors, solar cells, electrocatalysts for hydrogen evolution reactions (HERs), and lithium ion batteries.

Over the last few years, the study of 2D materials has become one of the most vibrant areas of nanoscience. Although this area was initially dominated by research into graphene, it has since broadened to encompass a wide range of 2D materials including BN, TMDs such as $MoS_2$ and $WSe_2$, TMOs such as $MoO_3$ and $RuO_2$, as well as a host of others including black phosphorous, silicene, and germanene. These materials are extremely diverse and have been employed in a wide range of applications in areas from energy to electronics to catalysis.

To prepare large quantities of 2D nanosheets from their 3D bulk materials, the previously proposed nanosheet production methods comprise either mechanical exfoliation or liquid phase exfoliation (LPE) (or "Scotch tape method"). Due to high quality monolayers occurring from mechanical exfoliation, this method is popularly used for intrinsic sheet production and fundamental research. Nevertheless, this method is not suitable for practical applications on a large scale due to its low yield and disadvantages in controlling sheet size and layer number.

In the LPE method, layered crystals, usually in powdered form, are exfoliated by ultrasonication, or shear mixing, usually in appropriate solvents or surfactant solutions. After centrifugation to remove any unexfoliated powder, this method gives dispersions containing large quantities of high quality nanosheets. Chemical exfoliation could largely increase production than mechanical exfoliation, whereas sonication during this process would cause defects to 2D lattice structure and reduce flake size down to a few thousand nanometers, limiting the applications of 2D nanosheets in the field of large-scale integrated circuits and electronic devices.

Recently, controllable preparation of 2D TMDs with large-area uniformity has remained a big challenge. The chemical vapour deposition (CVD) approach has attracted wide attention because it could synthesise 2D TMDs on a wafer-scale, which shows great potential toward practical applications like large-scale integrated electronics. This method not only could prepare continuous single film with certain thickness, but highlight in directly growth layered heterostructures, which would largely avoid interfacial contamination introduced during layer by layer transfer process. However, this method is of a low throughput, time-consuming and needs expertise. In the context described above, embodiments of the device 10 of the present invention provide a useful alternative to conventional CVD, LPE and mechanical exfoliation methods.

The invention will now be described in more detail, by way of illustration only, with respect to the following examples. The examples are intended to serve to illustrate this invention, and should not be construed as limiting the generality of the disclosure of the description throughout this specification.

Example 1

Pure SAW

Figure 7A:
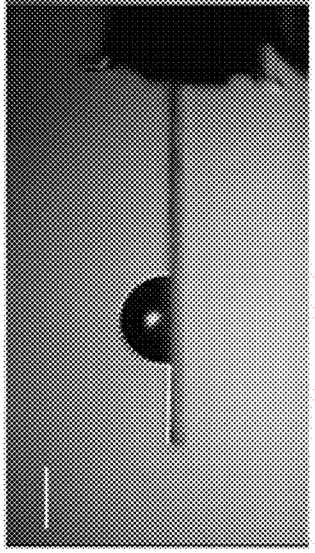
FIGS. 7(*a*) to 7(*c*) are laser Doppler vibrometry (LDV) images and a schematic diagram of the device configured to generate pure SAW.
Figure 7B:
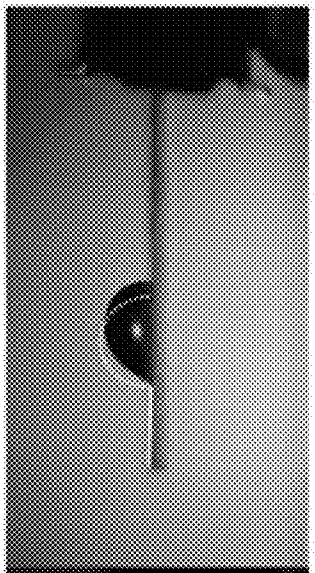
Figure 7C:
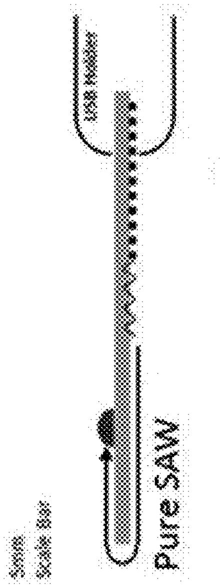

Referring to FIGS. 7(*a*) to 7(*c*), an acoustic wave microfluidic device 10 may be fabricated by patterning a mm aperture 40 pairs of finger 10 nm Cr/250 nm Al IDT 12 on a 128YX LN substrate 14 (Roditi Ltd, London, UK) using standard photolithography techniques. Note that the device 10 has been flipped relative to FIG. 1 such that the underside of the substrate 14 constitutes the surface along which the IDT 12 generates SAW. The device 10 is generally similar to the device 10 described above and depicted in the preceding figures except that the orientation of the IDT 12 is shown on the lower surface. A relevant design parameter may be the ratio between $\lambda_{SAW}$, determined by the width and gap of the IDT fingers 12, and the substrate 14 thickness h. Various asymptotic cases may be demonstrated in these examples by maintaining h constant throughout and altering the device's 10 resonant frequency f and hence $\lambda_{SAW}$. SAW may be generated by applying a sinusoidal electrical input at the resonant frequency of 10 MHz to the IDT 12 with a signal generator (SML01, Rhode & Schwarz, North Ryde, NSW, Australia) and amplifier (ZHL-5W-1 Mini Circuits, Mini Circuits, Brooklyn, NY 11235-0003, USA). Deionized (DI) water at room temperature may be used as the test fluid.

Figure 8A:
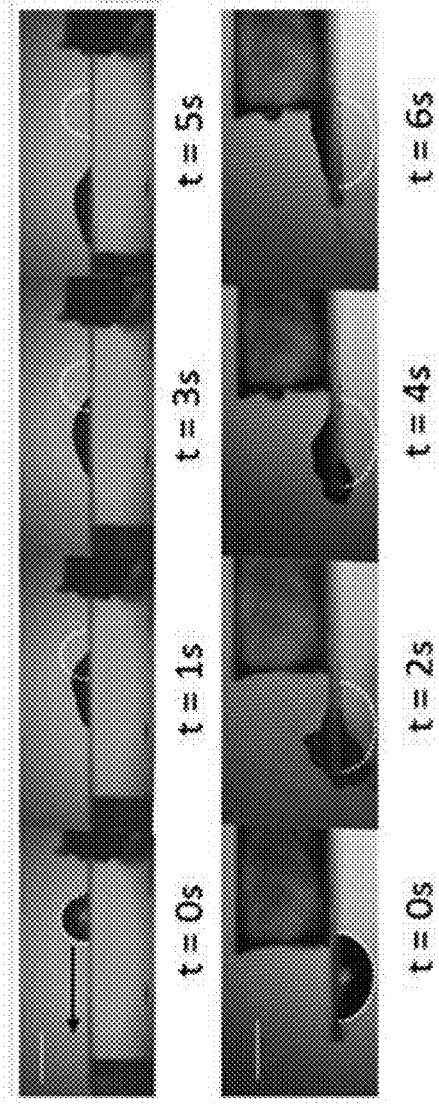
FIGS. 8(*a*) and 8(*b*) are LDV images and schematic diagrams of the device configured to respectively generate pure SRBW and pure SAW.
Figure 8B:
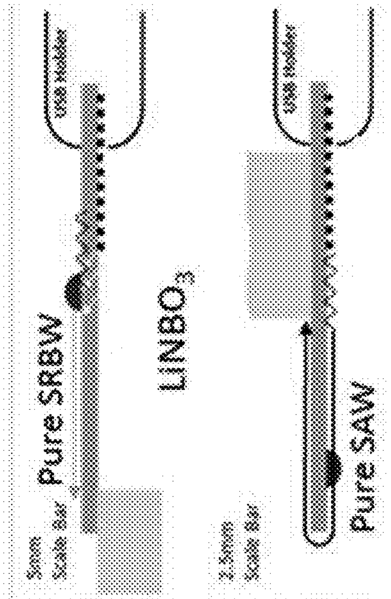

The conventional pure SAW device is therefore the case when $\lambda_{SAW}$<<1 h; ie, when the frequency is large, as illustrated in the schematic in FIG. 7(*c*) and the lower row of FIG. 8(*b*). In this configuration, the SAW energy, being confined within the penetration depth adjacent to the underside surface along which SAW is generated, rapidly decays over a lengthscale exp(−βz) through the thickness of the substrate 14, where β is the attenuation coefficient over which the SAW decays in the solid in the vertical z direction, such that it is completely attenuated before it reaches the top side of the substrate 14. In other words, no vibration on this face exists due to leakage of SAW energy through the substrate 14 (ie, the side on which the IDTs 12 are patterned). Instead, SAW on the underside surface propagates to the edge and continues around onto the top side if it is not reflected by a set of IDTs 12, although its energy attenuates along the substrate surface along its propagation direction x as exp(−αx), where α is the longitudinal attenuation coefficient of SAW in an unbounded fluid; ie, either in air or in liquid if one is present on the device 10. This can be seen from the LDV scan images in FIGS. 7(*a*) and 7(*b*) (LDV; UHF-120; Polytec PI, Waldbronn, Germany) which confirm the existence of SAW on both sides of the substrate 14. Further evidence of SAW may be seen in the lower row of LDV scans in FIG. 8(*a*) from the opposing directions that a millimetre dimension sessile drop 38 is transported under the SAW when placed on the top and bottom faces, given that a drop with height much greater than $\lambda_{SAW}$ translates in the direction of the SAW propagation due to Eckart flow.

Example 2

Pure SRBW

Referring to the schematic in the top row of FIG. 8(*b*), if the substrate 14 thickness becomes comparable to the SAW wavelength, (ie, $\lambda_{SAW}$/h~1) at moderate frequencies, it may be seen that the energy associated with the SAW, which propagates along the underside of the substrate, is transmitted throughout its thickness and is therefore no longer completely attenuated at the top side of the substrate 14. As such a bulk wave exists throughout the thickness of the substrate 12, which, due to the phase mismatch with the SAW and multiple internal reflections within the substrate 14, manifests as a travelling bulk surface wave along the top side, in what may be termed as a SRBW. The individual identity of such waves may have previously been overlooked, or merely referred to or conflated collectively with a wide range of other spurious bulk wave modes through the substrate 14 thickness simply as generic bulk acoustic waves—a consequence perhaps of the long-standing view since the 1950s that they were undesired and to be suppressed.

The existence of pure SRBW may be verified from the LDV scans as well as the opposing drop translational behaviour illustrated in the upper row of FIG. 8(*b*). When the SRBW is suppressed by placing the absorbent gel 40 (Geltec Ltd, Yokohama, Japan) on the top side of the substrate 14, a pure SAW exists that may be seen not only to translate the sessile drop 38 along the underside of the substrate 14 in the direction of its propagation, but also to push it around the edge to the top side. In contrast, when the SAW is absorbed by the gel 40 at the underside edge to prevent it from wrapping around to the top side, the SRBW drives the drop to translate along its propagation direction, which is opposite to the direction which the SAW would have caused it to translate had it travelled around the edge and onto the top side of the substrate 14.

Example 3

Hybrid SAW/SRBW

Figure 9A:
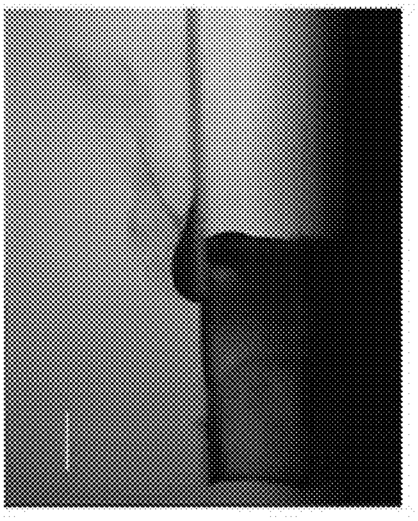
FIGS. 9(*a*) to 9(*c*) are an LDV image, a graph of drop size and volume, and a schematic diagram of the device configured to generate pure SRBW.
Figure 9B:
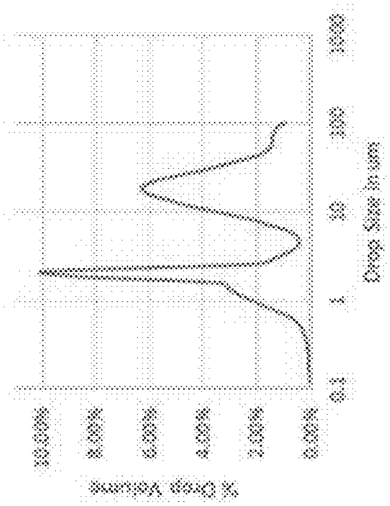
Figure 9C:
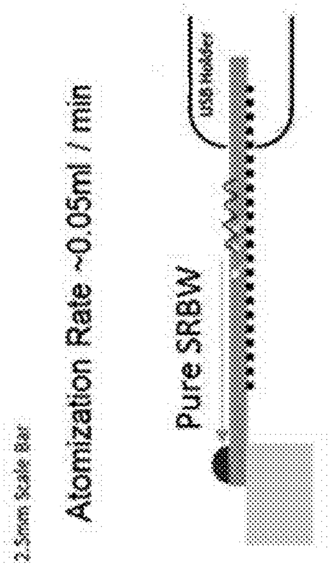
Figure 10A:
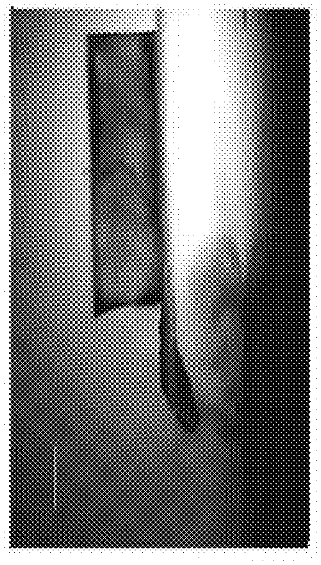
FIGS. 10(*a*) to 10(*c*) are an LDV image, a graph of drop size and volume, and a schematic diagram of the device when configured to generate pure SAW.
Figure 10B:
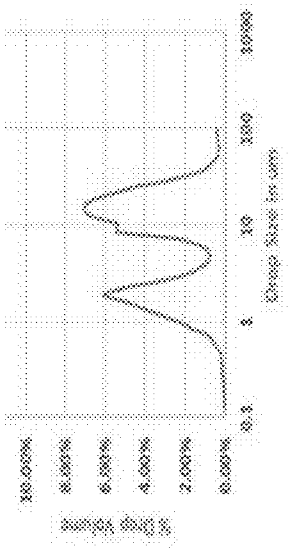
Figure 10C:
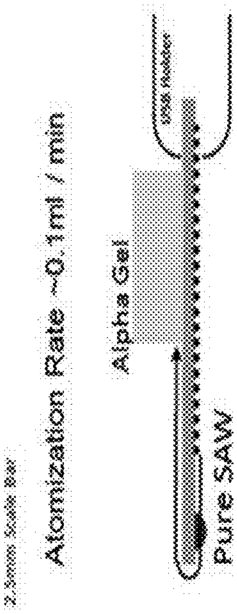
Figure 11A:
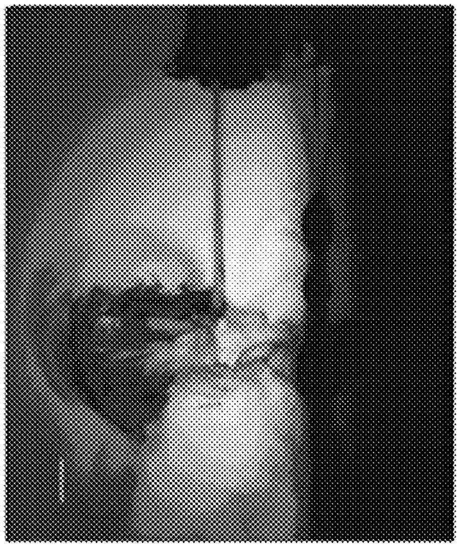
FIGS. 11(*a*) to 11(*c*) are an LDV image, a graph of drop size and volume, and a schematic diagram of the device when configured to generate a combination of SAW and SRBW.
Figure 11B:
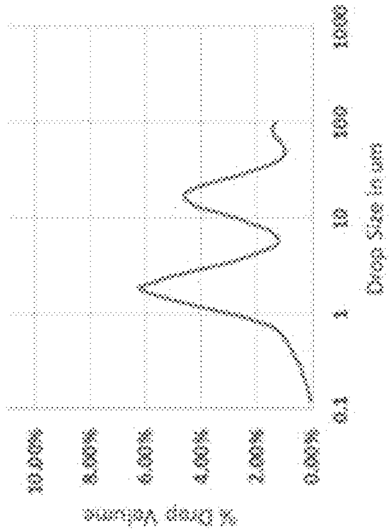
Figure 11C:
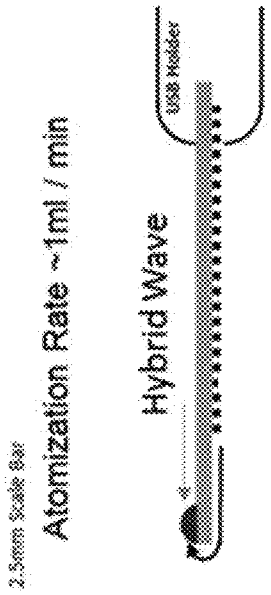

FIG. 11(*c*) illustrates the device 10 configured to exploit a combination of the SAW and SRBW on both faces of the substrate 14 for efficient microfluidic manipulation; ie, by requiring $\lambda_{SAW}$/h~1. Compared to microfluidic manipulation or nebulisation driven by pure SRBWs or pure SAWs as shown in FIGS. 9(*a*) to 9(*c*) and 10(*a*) to 10(*c*) respectively, FIGS. 11(*a*) and 11(*b*) show that there is a significant enhancement in the microfluidic manipulation or nebulisation performance—for example, an order of magnitude increase in the nebulisation rate—when both phenomena are combined, which hereafter may be referred to as HYbriD Resonant Acoustics (HYDRA). On the other hand, the size distributions of the aerosols that are generated, as determined by laser diffraction (Spraytec, Malvern Instruments, Malvern, UK), indicate that the mean aerodynamic diameters lie within the range of 1-3 μm for optimum dose delivery to the lung alveolar region. Aerosols above this range mainly deposit in the upper respiratory tract due to their inability to follow the inspiratory airflow trajectory in navigating the highly bifurcated branched network of the respiratory whereas aerosols below this range tend to be exhaled.

Figure 13:
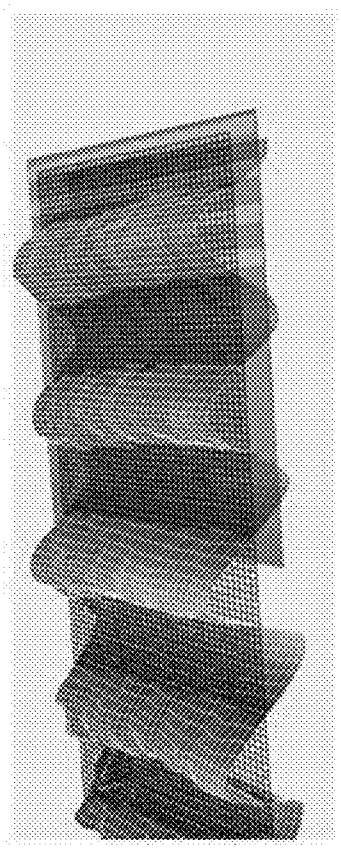
FIGS. 12 and 13 are respective LDV profiles of the combination of SAW and SRBW, and pure SAW.
Figure 12:
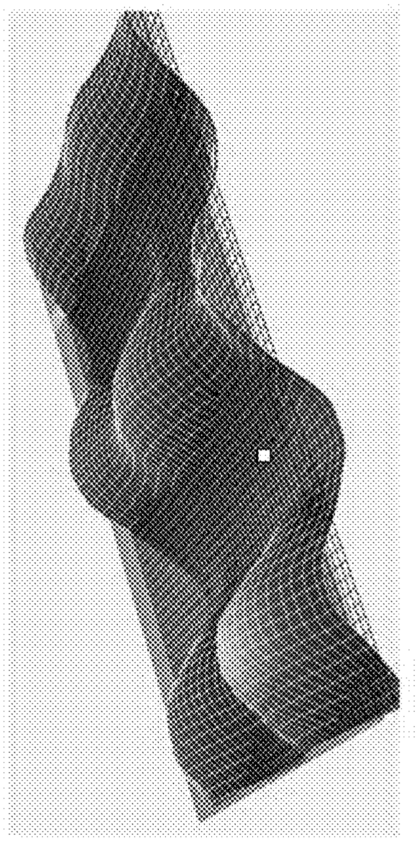

FIG. 12 is an example LDV profile of the hybrid SAW/SRBW generated in this example, while FIG. 13 is an example LDV profile of the pure SAW generated in Example 1.

Embodiments of the present invention provide small, compact, low cost and battery-powered acoustic wave microfluidic devices with increased acoustic wave energy utilisation that are useful for a wide range of microfluidic applications and operations, including those requiring increased microfluidic atomisation or nebulisation rates equal to or greater than 1 ml/min. In addition to nebulisation and atomisation of fluids and droplets, the microfluidic operations performed by embodiment devices may comprise all other alternative or equivalent types of acoustic wave microfluidic operations on the lithium niobate (and other piezoelectric substrates) including, but not limited to, fluid transport, mixing, jetting, sorting, centrifuging, particle trapping, particle sorting, coating, encapsulating, manipulating, and combinations thereof. Different embodiments of the invention are configured differently to use different combinations of different modes of acoustic wave energy—SAW, SRBW and standing acoustic waves—to optimise the net acoustic wave energy made available to atomise liquids. This results in acoustic wave microfluidic devices capable of providing very high and efficient rates of microfluidic manipulation of fluids, droplets, liquids, or reactions compared to previously proposed devices.

For the purpose of this specification, the word "comprising" means "including but not limited to," and the word "comprises" has a corresponding meaning.

The above embodiments have been described by way of example only and modifications are possible within the scope of the claims that follow.

The invention claimed is:

1. A device, comprising:

an electroacoustic transducer on a substrate;

a power supply to supply electromagnetic wave energy to the electroacoustic transducer; and a source of a substance that is movable to the substrate;

wherein the electroacoustic transducer and the substrate are configured to generate acoustic wave energy that is used to move the substance from the source to the substrate, and to manipulate the substance on the substrate, wherein the acoustic wave energy comprises a surface wave component and a bulk wave component, and wherein the device is configured such that the substrate has a thickness which is approximately equal to a wavelength of both the surface wave component and the bulk wave component.

2. The device of claim 1, wherein the device is configured such that the bulk wave component propagates between a first surface and a second surface opposite the first surface by internal reflection through the substrate between the first and second surfaces.

3. The device of claim 1, wherein the combination of the surface wave component and the bulk wave component is used to move the substance from the source to the substrate, and to manipulate the substance on the substrate.

4. The device of claim 1, wherein the acoustic wave energy further comprises a standing wave component in the electroacoustic transducer, and wherein the surface wave component and the bulk wave component are used to move the substance from the source along the substrate and onto the electroacoustic transducer as a liquid film, and wherein the standing wave component in the electroacoustic transducer is used to atomise or nebulise the liquid film.

5. The device of claim 1, wherein the source of the substance is arranged on, in or adjacent to a surface of the substrate, a side edge of the substrate, an end edge of the substrate, or a combination thereof.

6. The device of claim 1, wherein the power supply, substrate and source are integrated in a universal serial bus holder.

7. The device of claim 1, wherein the device is configured to nebulise or atomise the substance at a rate equal to or greater than 1 ml/min.

8. A method, comprising:

moving a substance from a source thereof to a substrate using hybrid acoustic wave energy generated by an electroacoustic transducer which receives electromagnetic wave energy from a power supply; and manipulating the substance on at least one surface of the substrate using the hybrid acoustic wave energy;

wherein the hybrid acoustic wave energy comprises a surface wave component and a bulk wave component such that surface acoustic waves propagate along the at least one surface of the substrate, and bulk acoustic waves internally reflecting between the at least one surface of the substrate and at least one other surface of the substrate, and further wherein the wavelength of both the surface wave component and the bulk wave component is approximately equal to the thickness of the substrate.

9. A method, comprising:

subjecting a substance on a substrate to hybrid acoustic wave energy generated by an electroacoustic transducer which receives electromagnetic wave energy from a power supply that comprises:

a surface wave component propagating along the at least one surface of the substrate, in combination with:

a bulk wave component internally reflecting between the at least one surface of the substrate and at least one other surface of the substrate, the wavelength of both the surface wave component and the bulk wave component being approximately equal to the thickness of the substrate; and a standing acoustic wave propagating in an electroacoustic transducer on the at least one surface of the substrate.

10. The device of claim 1, wherein the substance is atomised or nebulised to produce particles, powders or crystals with a diameter of 1 nm to 1 mm.

11. A method, comprising using the device of claim 1 to coat or encapsulate drug molecules for therapeutic purposes within particles or powders with a diameter of 1 nm to 1 mm.

12. A method, comprising using the device of claim 1 to purify or desalinate a liquid by separating salt, crystals or impurities from the liquid.

13. A method, comprising using the device of claim 1 to exfoliate a material from a three-dimensional (3D) bulk form to a two-dimensional (2D) exfoliated form.

14. The method of claim 13, wherein the material comprises graphene, boron nitride (BN), transition metal dichalcogenides, transition metal oxides, black phosphorous, silicene, germanene, and combinations thereof.

15. The method of claim 13, wherein the 3D bulk form of the material comprises the material in a liquid or an intercalating material.

16. The method of claim 13, wherein the 2D exfoliated form of the material comprises a sheet, a quantum dot (QD), a flake, a layer, a film, or combinations or pluralities or structures thereof.

17. The method of claim 13, wherein the 2D exfoliated form of the material has lateral dimensions between 1 nm and 2000 nm.

18. The device of claim 1, wherein the substrate comprises a single crystal piezoelectric substrate.

19. The device of claim 1, wherein the substance comprises functional or therapeutic agents selected from the group consisting of drugs, soluble substances, polymers, proteins, peptides, DNA, RNA, cells, stem cells, scents, fragrances, nicotine, cosmetics, pesticides, insecticides, and combinations thereof.

20. The device of claim 1, wherein manipulation of the substance comprises atomising, nebulising, moving, transporting, mixing, jetting, streaming, centrifuging, trapping, separating, sorting, coating, encapsulating, manipulating, desalinating, purifying, exfoliating, layering, or combinations thereof.

21. An inhaler or nebuliser for pulmonary drug delivery comprising the device of claim 1.

* * * * *